United States Patent [19]

Ogilvie

[11] Patent Number: 5,399,829
[45] Date of Patent: Mar. 21, 1995

[54] MATERIAL TREATMENT METHOD AND APPARATUS

[75] Inventor: Graeme J. Ogilvie, Ocean Grove, Australia

[73] Assignee: Carter & Ogilvie Research Pty. Ltd., Victoria, Australia

[21] Appl. No.: 84,707

[22] Filed: Jun. 25, 1993

[30] Foreign Application Priority Data

Jun. 25, 1992 [AU] Australia ............................ PL3168

[51] Int. Cl.⁶ .............................................. B23K 10/00
[52] U.S. Cl. ........................... 219/121.38; 219/121.36; 219/121.59; 219/121.37; 219/121.52; 373/18
[58] Field of Search ...................... 219/121.47, 121.48, 219/121.52, 121.38, 121.36, 75, 76.15, 76.16, 121.59, 121.37; 373/18–22

[56] References Cited

U.S. PATENT DOCUMENTS

| | | | |
|---|---|---|---|
| 3,843,351 | 10/1974 | Smith et al. | 75/10 R |
| 4,060,708 | 11/1977 | Walters | 219/121.52 |
| 4,535,225 | 8/1985 | Wolf et al. | 219/383 |
| 4,683,367 | 7/1987 | Drouet | 219/121.59 |
| 4,990,739 | 2/1991 | Zaplatynsky | 219/121.47 |
| 5,017,754 | 5/1991 | Drouet et al. | 219/121.36 |
| 5,108,718 | 4/1992 | Dummersdorf et al. | 219/121.52 |
| 5,159,173 | 10/1992 | Frind et al. | 219/121.47 |

FOREIGN PATENT DOCUMENTS

| | | |
|---|---|---|
| 1074022 | 12/1952 | France . |
| 2635371 | 2/1990 | France . |
| 916288 | 12/1955 | Germany . |
| 705011 | 3/1954 | United Kingdom . |

Primary Examiner—Mark H. Paschall
Attorney, Agent, or Firm—Oliff & Berridge

[57] ABSTRACT

A method of treating waste material which involves creating a substantially continuous curtain of plasma and directing the material to be treated through that curtain. An electric arc is generated between two electrodes which are separated by an annular space, and the arc column is caused to rotate about the axis of that annular space so that a substantially uninterrupted curtain of plasma bridges the space and extends around the circumferential extent of the space. The direction of rotation of the arc column is generally transverse to the direction in which that column extends between the two electrodes, and material to be treated is fed through the curtain in a direction which is transverse to both the rotational direction and the direction of longitudinal extent of the arc column. One of the electrodes may be of cylindrical tubular form, in which event material to be treated is fed into the region of the arc through the axial bore of that electrode. The other electrode may have a cavity in alignment with the adjacent end of the tubular electrode which serves to direct material in a direction such as to pass through the plasma curtain.

19 Claims, 4 Drawing Sheets

MATERIAL TREATMENT METHOD AND APPARATUS

FIELD OF THE INVENTION

This invention relates to the treatment of material by use of an electric arc. The invention is particularly but not exclusively concerned with the treatment of waste products so as to enable or assist their safe disposal. It will be convenient to hereinafter describe the invention with particular reference to that example application of the invention.

BACKGROUND OF THE INVENTION

Efficient and effective disposal of waste products is a matter of major concern. Various methods have been proposed and adopted, but none has proven to be entirely satisfactory. The use of an electric arc to treat waste product has a number of attractions, but a major problem with such a method is the difficulty of ensuring that all material passing by the arc is uniformly treated. The relatively small cross-sectional size of the arc is a major factor in that difficulty.

OBJECTS OF THE INVENTION

It is an object of the present invention to provide an improved method and apparatus for treating materials. It is a further object of the invention to provide such a method and apparatus which involves the use of an electric arc and which is such that there is substantially uniform treatment of material passing by the arc. It is an object of the invention in a preferred form to provide such a method and apparatus for treating waste products.

SUMMARY OF THE INVENTION

According to one aspect of the invention, there is provided a method of treating material, including the steps of generating an arc between two electrodes, causing movement of the arc such that the arc attachment at each said electrode moves across a surface of the respective said electrode to thereby form a substantially uninterrupted curtain of plasma between the two electrodes, and passing material to be treated through said curtain.

According to a further aspect of the invention, there is provided apparatus for treating material including first and second electrodes, means operative to cause an electric arc to be generated between said electrodes, arc influencing means operative to cause the arc attachment at each said electrode to move across a surface of the respective said electrode so as to thereby form a substantially continuous curtain of plasma between said electrodes, and means operative to direct a stream of material to pass through said curtain.

It is preferred that an annular space exists between the two electrodes and that the plasma curtain is formed around that space as a result of rotating the arc about the axis of the annular space. The material to be treated may be fed through the curtain in a direction away from or towards the axis of the annular space, but the former is generally preferred. It is further preferred that one of the electrodes is in the form of a cylindrical tube which is substantially coaxial with the annular space, and that material is fed longitudinally through the interior of that electrode towards the treatment zone, which is the zone of the plasma curtain.

In one particularly satisfactory form of the method, the direction in which the arc extends between the two electrodes is transverse to the direction in which the arc is moved to create the plasma curtain. The material is moved through the curtain in a direction which is transverse to both the direction in which the arc extends and the direction in which the arc is moved. By way of example, in the case where the arc is moved about a circular path to create an annular curtain of plasma, that path is transverse to the direction in which the arc extends between its attachments to the two electrodes. Material which is caused to flow through the curtain on the other hand, has a direction of movement which is transverse to both the direction in which the arc extends and the direction in which the arc is moved.

The annular curtain and the space surrounded by that curtain, constitutes a material treatment zone. It is preferred that material to be treated is fed towards that zone along one path, and that the product of the treatment 13 moved away from the treatment zone along another path which extends in the substantially opposite direction to the direction of the first path. It is further preferred that the two paths are separated by a wall of heat conductive material.

In circumstances where one of the electrodes is of tubular form, the material to be treated and the product that treatment may flow in opposite directions along the inner and outer surfaces respectively of the tubular electrode. Preferably, the material to be treated is subjected to the direct influence of the electric arc at or near an end of the tubular electrode, and the material flow changes direction at that end so as to move towards and through the plasma curtain. The flow along each of the two paths is substantially parallel to the axial direction of the tubular electrode. In a preferred arrangement, the flow is from the inside to the outside of the tubular electrode, but the reverse could apply.

Several benefits arise out of use of such a method, and they will emerge in subsequent passages of this specification. It is particularly relevant however, that the thermal efficiency of the process is enhanced because the material being treated flows in opposite directions along the inner and outer surfaces respectively of the tubular electrode.

In one form of the method, the material to be treated is fed to the region of the arc in a stream which contains a quantity of water. Water at a suitable temperature (e.g., above 650° C.) is a potent agent for the conversion of complex organic materials to simple more benign substances. The carbon in such substances is oxidised to carbon monoxide while hydrogen is released, and the hydrogen may react with other substances such as chlorine.

It is preferred that the arc is struck between adjacent ends of the tubular electrode and another electrode having a cylindrical well or cavity formed in its respective adjacent end and arranged substantially coaxial with the tubular electrode. The outer diameter of the tubular electrode is no greater than, but preferably less than, the diameter of the cavity. In one possible arrangement, the tubular electrode protrudes into the cavity of the other electrode, and the material being treated flows through a clearance space formed between the outer surface of the tubular electrode and the surrounding cylindrical surface of the cavity.

It is further preferred that the tubular electrode extends upwardly from the other electrode and is disposed with its longitudinal axis substantially vertical. In that form of construction, the other electrode will be arranged so that the axis of its cavity will be similarly disposed.

The electrode having the cavity, which is the lower electrode in the above arrangement, may also be of tubular form. At least, the end portion adjacent the smaller diameter tubular electrode may be tubular. In such an arrangement, the base of that cavity may be formed in any appropriate manner, and it may be formed by either a solid or a liquid barrier. In the event that a solid barrier is used to form the base, a drain may be provided within that base through which slag or metal residue may escape as hereinafter explained. Preferably, material escaping through that drain falls into a body of liquid such as water which quenches the deposited material and also acts as a gas seal for the apparatus.

According to yet another possible arrangement, the lower or cavity forming electrode is rotatable about the axis of the cavity. As hereinafter explained, such an arrangement assists in separating heavy residue from the gas stream which moves through the region of the arc.

Rotation of the arc as previously referred to, can be achieved in any of a variety of ways. For example, the arc may be driven to rotate by magnetic means or by a flow of gas, or a combination of both. The configuration of the electrodes particularly described above however, may be such as to naturally impart a radial component in the movement of the material stream through the region of the arc. That radial component may cause or at least encourage rotation of the arc, and in some circumstances may be the sole means for driving the arc into rotary motion.

Also, the geometry of the two electrodes may be such that gas flow through the arc zone is relatively unhindered. As a result, it is possible to achieve a relatively high residence time for the material in the arc zone.

BRIEF DESCRIPTION OF THE DRAWINGS

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

In the drawings.

DETAILED DESCRIPTION

Figure 1:
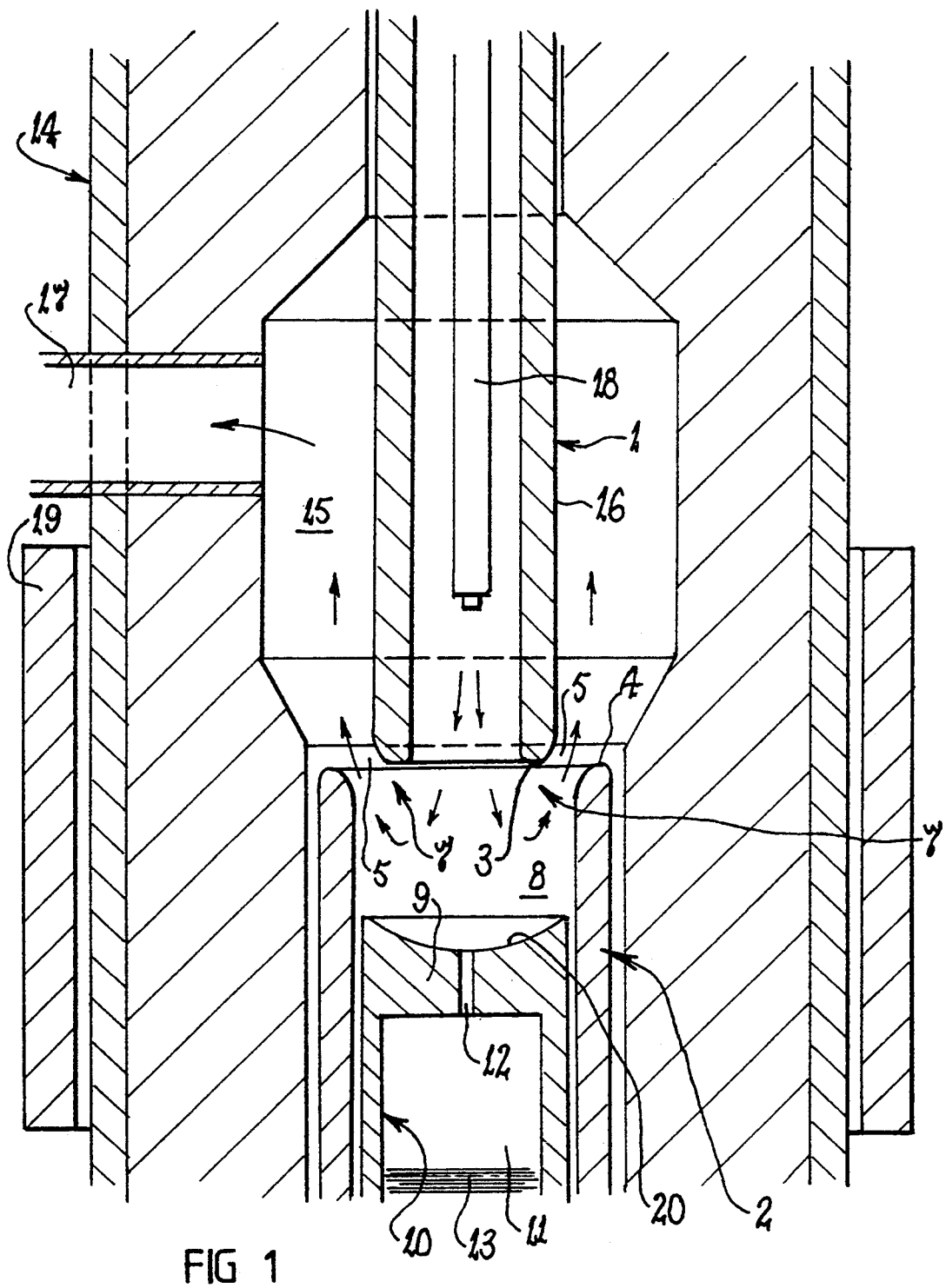
FIG. 1 is a cross-sectional diagrammatic view of one form of apparatus in accordance with the invention.

FIG. 1 shows, in diagrammatic form, one possible form of apparatus for carrying out the method of the invention. That apparatus includes two tubular electrodes 1 and 2, which are arranged in substantially coaxial relationship and with axes extending substantially vertical. The outer diameter of the electrode 1 is at least no greater than, and is preferably smaller than, the inner diameter of the electrode 2. Also, as shown, the two electrodes 1 and 2 are arranged with their adjacent ends 3 and 4 relatively close, and the electrode 1 extends upwardly from the electrode 2.

Any suitable material may be used to form the electrodes, but they are preferably formed from a refractory carbide such as silicon carbide or tantalum carbide.

Figure 2:
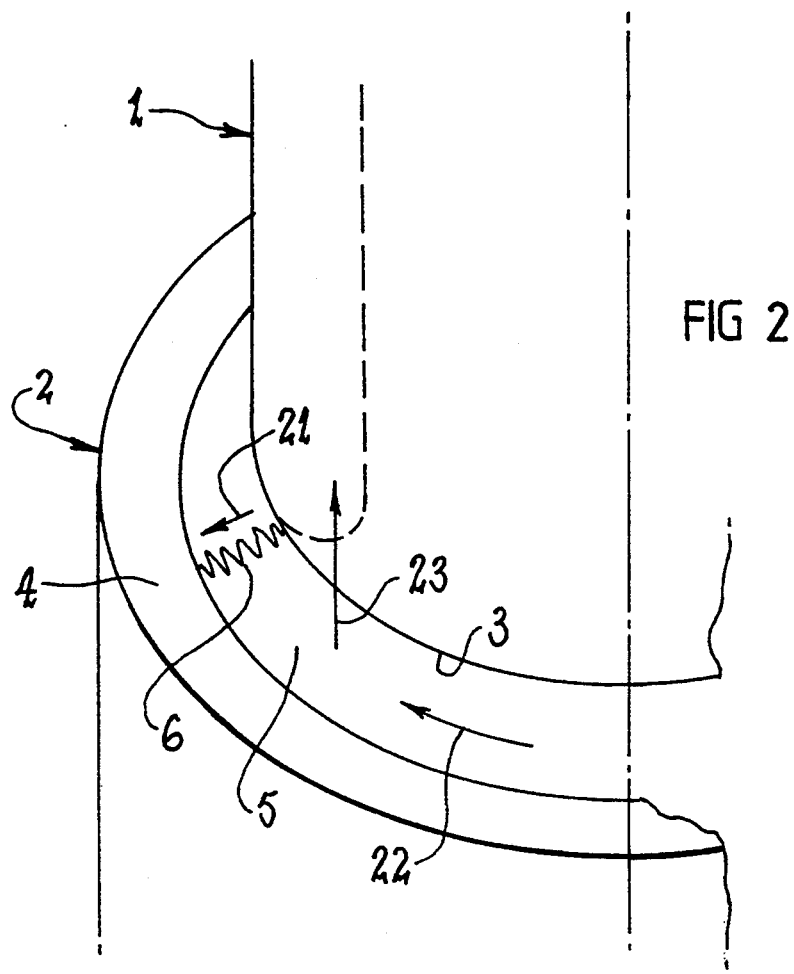
FIG. 2 is a perspective view of part of the apparatus shown in FIG. 1.

As will be evident from FIG. 1, an annular space 5 is provided between the electrode ends 3 and 4. Means (not shown) is provided to generate an electric arc 6 between the electrode ends 3 and 4 so as to extend across the space 5 as shown in FIG. 2. Opposite ends of that arc 6 attach to surfaces of the electrodes 1 and 2 respectively as is well known in the art. Further means as hereinafter described, is provided to induce movement of each of the two arc attachments across the respective electrode surface so that the arc 6 rotates about the longitudinal axis of the electrodes 1 and 2. As a result of that rotation, a substantially uninterrupted curtain of plasma can be formed across the space 5.

Means is provided in the arrangement shown to induce reverse travel of material to and from the treatment zone 7 (FIG. 1) which is in the region of the arc 6 and the plasma curtain formed by rotation of that arc. The arrangement is such that the material to be treated travels along a first path which is at one surface of the tubular electrode 1, and the product of the treatment travels along a second path which is at another surface of that electrode. In the arrangement shown, the first path is through the interior of the electrode 1, and the second path is along the outside of that electrode. Any suitable means could be provided to induce the desired flow reversal, but in the particular arrangement shown, that means includes a cavity 8 formed in the end 4 of the electrode 2. The base 9 of the cavity 8 can be formed in any appropriate manner. It may be integral with or formed separate from the electrode 2, and is preferably formed of the same material as the electrode 2.

In the particular arrangement shown, the base 9 of the cavity 8 is formed by a member 10 located within the lower electrode 2 and arranged to form a barrier across the axial bore of that electrode. A hollow space 11 is provided below the base 9, and a drain passage 12 is formed through the base 9 to allow material to fall from the cavity 8 into a body 13 of liquid such as water. That space 11 and drain passage 12 are not necessary in all forms of the apparatus.

The electrodes 1 and 2 are contained within a housing 14, preferably made of or lined with a suitable refractory material, and an annular chamber 15 is provided within that housing 14 around the end portion 16 of the electrode 1. A discharge passage 17 formed through the housing 14 communicates with the chamber 15. Other arrangements are clearly possible.

Material to be treated, hereinafter called feed material, may be introduced into the apparatus in any appropriate way. In the particular construction shown, the feed material is introduced by way of a feed tube 18 disposed substantially coaxial within the upper electrode 1. The feed material may be of a heterogeneous nature, including, by way of example, gases, solids and liquids. In a preferred arrangement, the feed material includes a quantity of water for reasons previously stated.

Any suitable means may be provided to cause rotation of the arc 6 struck between the electrodes 1 and 2, and in the arrangement shown such means includes a magnetic field core 19 located around the housing 41 near the region of the arc 6.

When apparatus according to FIG. 1 is in use, an arc 6 is struck between the electrode ends 3 and 4, and feed material is introduced into the treatment zone 7 through the tube 18. In particular, that material travels axially through the inside of the electrode 1 towards the cavity 8 as indicated by the arrows in FIG. 1. Material entering the cavity 8 encounters the barrier formed by the base 9 and is thereby deflected radially outwards and upwards towards the annular space 5 formed between the electrode ends 3 and 4, as shown by the arrows in FIG. 1. As previously indicated, a plasma curtain effectively extends across and around the space 5 because of the rapid rotation imparted to the arc 6 by the magnetic field induced by the coil 19. The continuity of that curtain will depend upon the speed of rotation of the arc 6, and the curtain will generally be of frusto-conical form because of the relative arrangement of the electrode ends 3 and 4. If the arc current and the speed of rotation of the arc 6 are both sufficiently high, the curtain will in effect become a conical plasma sheet.

Material entering the space 5 is thereby subjected to the direct influence of the arc, and substantially uniform treatment of the material stream results. Because of exposure to the arc 6, the material constitents will be destroyed or will undergo change or reaction such as to, for example, become environmentally safe.

The electrical power input to the arc 6 is divided between the electrodes 1 and 2 and the column of the arc 6. Since the arc column is relatively remote from cool parts of the apparatus, a relatively high level of the power dissipated in the arc column will be transferred to the feed material. The higher the arc voltage (i.e. by increasing the electrode gap) the higher the efficiency of transfer of input power to the feed material.

One consequence of the magnetically driven rapid translation of the arc 6 is that a higher arc voltage is required for a given current as compared with an arc carrying the same current but stationary in the absence of a magnetic field. Another consequence is that electrode wear is substantially reduced.

The product of the treated material, which is primarily gas, which passes beyond the arc curtain, will have a very high temperature. Consequently, as that material travels over the outside of the electrode 1 towards the discharge passage 17, there will be a transfer of heat to the tubular wall of the electrode 1. Heat is thereby transferred through that wall to the colder material stream exiting from the tube 18, thereby enhancing the thermal efficiency of the process.

Reversal of flow through the region of the arc 6 has the further benefit of minimising the possibility of liquid droplets and solid particles being carried in the exit stream of material product flowing from the arc zone to the discharge passage 17. Because of their inertia, such droplets and particles will tend to fall towards the base 9 of the cavity 8. It is therefore very difficult for untreated material to reach the discharge passage 17.

Any liquid such as slag or molten metal residue which separates from the material stream passing through the cavity 8, will tend to collect on the cavity base 9 and then drain through the passage 12. The upper surface 20 of the base 6 may be appropriately shaped for that purpose. The slag and molten metal will then fall into the water body 13 with consequent rapid quenching. That water body 13 also serves to form a seal against escape of gas from the apparatus.

In a variation of the apparatus described above, the solid base 9 may be omitted and the water body 13 may form the lower end of the cavity 5 so that it in effect substitutes for the base 9.

A feature of the arrangement described is that material passes through the plasma curtain in a direction which is generally transverse to both the direction in which the arc 6 extends and the direction in which the arc 6 is moved or rotated. Furthermore, the last two mentioned directions are transverse to one another.

Figure 3:
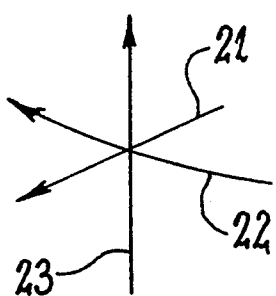
FIG. 3 is a diagrammatic representation of the directions in which the arc extends and is moved, and the direction in which material is passed through the plasma curtain formed by the arc.

In FIG. 2, the direction in which the arc 6 extends is represented by the arrow 21, the direction of rotation of the arc 6 is represented by the arrow 22, and the direction of movement of material through the plasma curtain is represented by the arrow 23. FIG. 3 diagrammatically shows the mutually transverse arrangement of those three directions.

Figure 4:
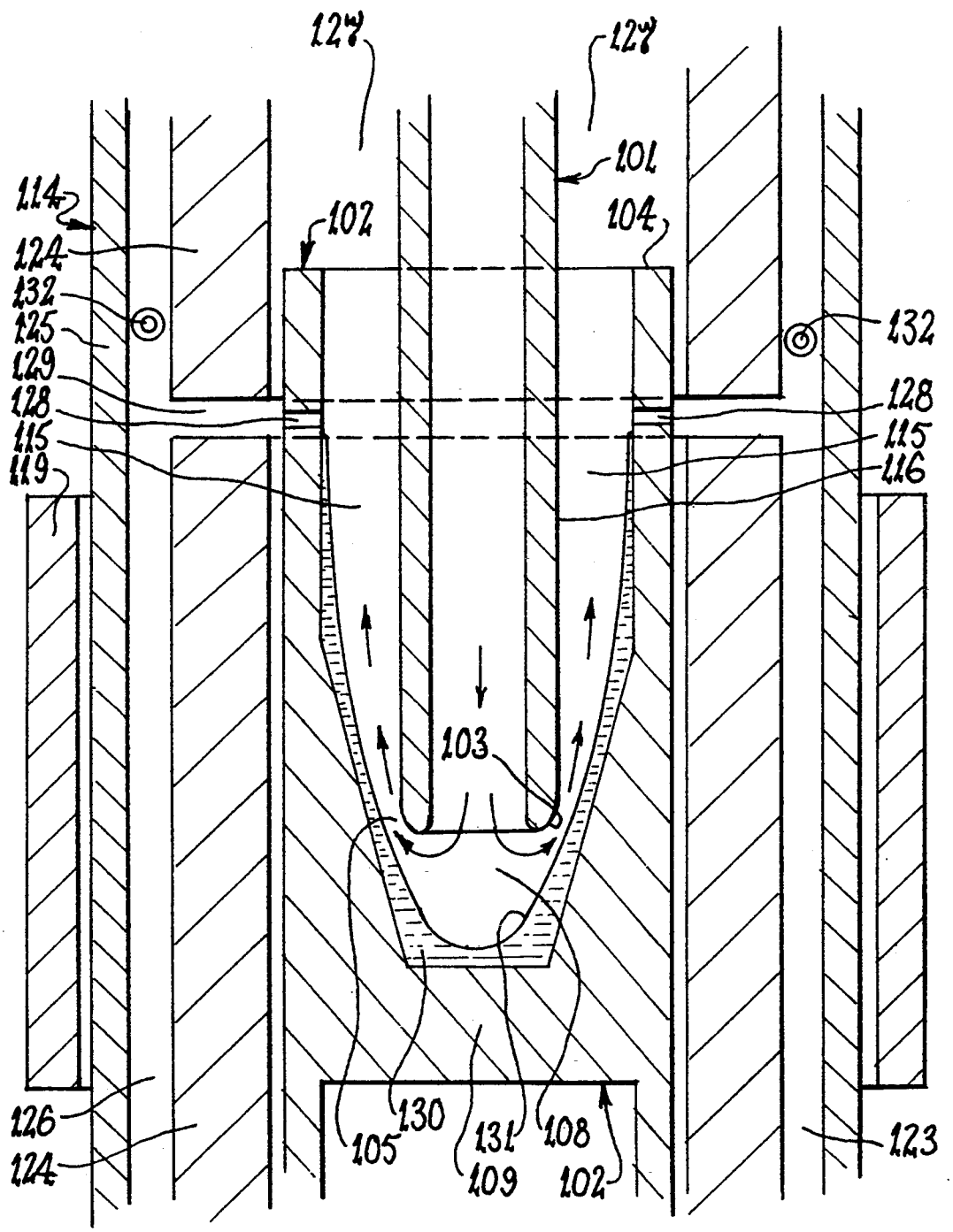
FIG. 4 is view similar to FIG. 1 but showing another embodiment of the invention.

FIG. 4 shows another possible form of apparatus for carrying out a method according to the invention. Components of the FIG. 4 embodiment which correspond to components of the FIG. 1 embodiment, will be identified by like reference numerals except that they will be in the number series 100 to 199.

A significant difference between the FIG. 1 and FIG. 4 embodiments is that in the latter the end portion 116 of the electrode 101 extends well into the cavity 108 of the electrode 102. Also, the diameter of the cavity 108 is enlarged towards the electrode end 104 so that an annular chamber 115 of reasonable cross-sectional size is created between the outer surface of the electrode 101 and the surrounding surface of the cavity 108. That annular space 115 is the functional equivalent of the space 15 of the FIG. 1 embodiment even though it is formed between different surfaces.

In the preferred arrangement shown, the housing 114 includes a lining part 124 and an outer wall 125. A space 126 may be provided between the lining 124 and the wall 125 for a reason explained below. The stream of feed material gas which flows upwards along the outer surface of the electrode 101 may travel through the space 127 above the electrode 102 to an appropriate discharge.

Escape passages 128 are formed through the wall of the cavity 105 adjacent the electrode end 104, for a reason explained below. Those passages 128 communicate with a continuous slot 129 or other form of separation, which may be continuous or non continuous, between upper and lower sections of the housing lining 124.

The electrode 102 is mounted for rotation about its axis, and any suitable means may be adopted to cause it to rotate about that axis. The speed of rotation can be selected according to requirements.

Feed material may be introduced into the apparatus as described in connection with the FIG. 1 embodiment, or in accordance with any other arrangement as may be desired.

When the FIG. 4 embodiment is in use, an arc is struck between the electrode end 103 and the adjacent surface of the cavity 108. As in the previously described embodiment, the arc column is driven by a magnetic field, or other appropriate means, so as to sweep out a conical path having its centre at the axis of the electrodes 101 and 102.

Rotation of the electrode 102 relative the electrode 101 results in liquid metal and other heavy constituents of the feed material stream being flung radially outwards to accumulate on the inside surface of the cavity 108. As that precipitated material accumulates on the surface of the cavity 105, it will tend to develop into a body 130 of precipitate having a deeply paraboidal free surface 131. The internal configuration of the cavity 108 may assist in that regard, and particularly the frusto-conical form of the lower part of that cavity as shown in the particular embodiment described.

As the precipitate continues to accumulate on the surface of the cavity 108, it will tend to move up that surface towards the escape passages 128. Again the shape of the lower part of the cavity 108 may assist in that regard. Precipitate will thereby escape from the electrode 102 to enter the slot 129, from which it will pass into the space 126 formed between the lining part 124 and the outer wall 125 of the housing 114.

If desired, means 132 may be provided to maintain a stream of water or other coolant within the space 126 so as to quench the precipitate entering that space.

In all other respects, the embodiment of FIG. 4 may operate generally in the same manner as the FIG. 1 embodiment.

Figure 5:
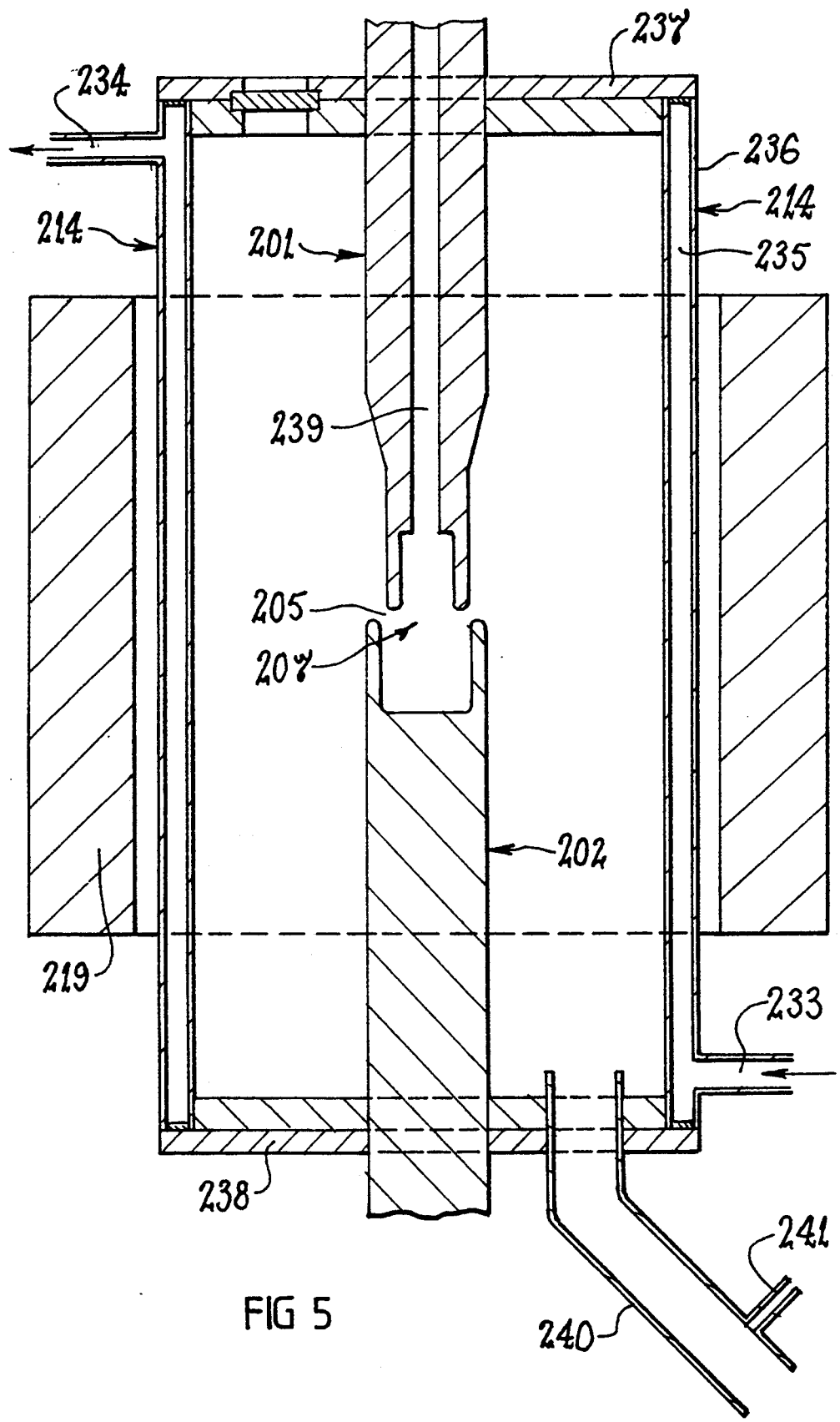
FIG. 5 shows yet another embodiment of the invention.

The embodiment shown by FIG. 5 has been successfully used in practice using argon as a plasma gas. Components of that embodiment which correspond to components of the FIG. 1 embodiment will be given like reference numerals except that they are in the number series 200 to 299.

Electrodes 201 and 202, which may be composed of graphite, are contained within a water cooled cylindrical housing 214. The conduits 233 and and 234 represent the water inlet and water outlet respectively which connect with the hollow interior 235 of the housing wall 236. The wall 236 may be composed of austenitic stainless steel or other suitable material. End walls 237 and 238 of the housing 214 may be made of any suitable heat resistant material, which is preferably electrically non-conductive.

An axial magnetic field is produced at the annular space 205 by means of a suitable coil 219. The coil 219 could be connected in series with one of the electrodes 201 and 202, but such an arrangement may not be satisfactory in all circumstances.

Material to be treated is introduced into the treatment zone 207 through the axial bore 239 of the electrode 201. The product of the material treatment is removed through the discharge conduit 240, which may have a connected branch line 241 for gas sampling purposes.

It will be apparent from the foregoing description that a method and apparatus as described provides substantially benefits in the treatment of waste products and other materials. The use of water as an oxidant in a preferred form of the method as described, is a matter of some significance. It is essential in conventional plasma torches to use an inert gas such as argon or a non-oxidising gas such as hydrogen, to form the plasma stream. When such a plasma torch is used to treat waste or other materials with significant carbon content, it is often necessary to inject air or oxygen to prevent carbon deposits from accumulating and thereby adversely effecting operation of the torch. In the apparatus according to the present invention, the use of suitable electrode materials and arrangement of electrodes, enables water to be used for both purposes because carbides, such as silicon carbides can tolerate high temperatures in an oxidising environment.

At temperatures above 1000° C. water reacts with carbon $$C + H_2O \rightarrow CO + H_2$$

This is the reaction which is exploited in gas producers as used to make fuel gas from coke. The reaction is endothermic. For more chemically complicated substances, the effect, in general, of exposure to water vapour at temperatures greater than 1000° C. is to decompose the substances to produces CO, $H_2$ and other simple substances such as acidic anhydrides, e.g., HCl.

Other advantages of the method and apparatus described are as follows. The system is tolerant in that it can treat gases, liquids, solids or heterogeneous inputs. There is no cold zones between the input and exit sides of the feed material stream, and the possibility of material escaping destruction by a surface diffusion or boundary layer mechanism is minimised if not prevented. There is also the advantage of achieving relatively high residence time of feed material within the region of the arc. Other advantages are:

A. The use of water as an oxidant provides a cheap, universally available and safe means of effectively inhibiting carbon deposit.
B. The electrode geometry is relatively simple, and enables convenient incorporation of devices for mechanical removal of deposits.
C. The geometry of the electrodes is such that there is relatively little restriction to gas flow in the region of the arc. The rate of gas flow is relatively low, and as a consequence the residence time of the gas within the arc region is relatively high.
D. The use of carbides for the electrodes enhances the useful life of the electrodes.
E. The arc geometry and the absence of water cooling of surfaces close to the arc column, result in a much higher power efficiency as compared with conventional plasma torches.
F. There is no need for an argon shield for the electrodes as in conventional arrangements.
G. The apparatus is relatively simple and relatively inexpensive to manufacture.

Various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. A method of treating material, comprising the steps of:
   generating an arc between two electrodes at least one of which is tubular,
   causing movement of the arc such that the arc attachment at each said electrode moves across a surface of the respective said electrode to thereby form a substantially uninterrupted curtain of plasma between the two electrodes,
   feeding said material as a stream in one direction along a first surface of said tubular electrode toward a treatment zone at which said curtain is formed, and
   passing said material stream through said plasma curtain and moving a product of the treatment which occurs in said treatment zone a substantial distance along and in contact with a second surface of said tubular electrode in a direction opposite to said one direction, thereby transferring heat to said tubular electrode.

2. A method according to claim 1, wherein a direction in which said arc extends is transverse to a direction in which said arc is moved to create said curtain, and said material is moved through said curtain in a direction which is transverse to both said arc extending direction and said arc movement direction.

3. A method according to claim 1, wherein the step of passing said material stream through said plasma curtain involves imparting a radial component to the movement of said stream, said radial component of said movement being influenced at least in part by the shape of an other of said two electrodes.

4. A method according to claim 3, wherein at least an end portion of the other of said two electrodes is tubular and said arc movement involves rotational movement of said arc about axes of the electrodes.

5. A method according to claim 4, wherein said one tubular electrode and said tubular end portion of the other electrode are substantially cylindrical and have different diameters.

6. A method according to claim 5, wherein said material is fed as a stream toward said treatment zone through an interior of said tubular electrode.

7. A method according to claim 6, wherein a diameter of said tubular electrode is less than a diameter of the other said electrode.

8. A method according to claim 7, wherein the other said electrode is rotated about its axis.

9. A method according to claim 1, wherein water is added to said material before said material passes through said curtain.

10. Apparatus for treating material, comprising:
a first tubular electrode and a second electrode,
means for generating an electric arc between said electrodes,
arc influencing means for causing an arc attachment at each said electrode to move across a surface of the respective said electrode so as to thereby form a substantially uninterrupted curtain of plasma between said two electrodes,
means for feeding said material as a stream in one direction along one surface of said tubular electrode towards a treatment zone at which said curtain is formed, and
means for directing said stream of material to pass through said plasma curtain and move a product of the treatment a substantial distance along and in contact with a second surface of said tubular electrode in a direction opposite to said one direction, thereby transferring heat to said tubular electrode.

11. Apparatus according to claim 10, wherein at least an end portion of said second electrode is tubular.

12. Apparatus according to claim 11, wherein said first and second electrodes are substantially cylindrical and have different diameters.

13. Apparatus according to claim 12, wherein a diameter of said first tubular electrode is less than a diameter of said second electrode and said material is fed through an interior of said first electrode.

14. Apparatus according to claim 13, wherein a cylindrical cavity is formed in said second electrode, said cavity is arranged substantially coaxial with said first tubular electrode and has a base spaced axially from an adjacent end of the tubular electrode, and said cavity forms at least part of said stream directing means.

15. Apparatus according to claim 14, wherein a terminal end portion of said first tubular electrode extends into said cavity.

16. Apparatus according to claim 10, wherein said arc influencing means is for causing said arc to rotate about an axis of said tubular electrode.

17. Apparatus according to claim 10, wherein said second electrode is rotatable about its axis.

18. Apparatus according to claim 14, wherein said base of said cylindrical cavity is shaped to impart a radial component to movement of said stream of material.

19. An apparatus for treating material, comprising:
a first tubular electrode;
a second electrode;
a generator generating an electric arc between said electrodes;
an arc influencer causing an arc attachment at each said electrode to move across a surface of the respective said electrode so as to thereby form a substantially uninterrupted curtain of plasma between said two electrodes;
a feeder feeding material as a stream in one direction along one surface of said tubular electrode towards a treatment zone at which said curtain is formed; and
a controller directing said stream of material to pass through said plasma curtain and move a product of the treatment a substantial distance along and in contact with a second surface of said tubular electrode in a direction opposite to said one direction, thereby transferring heat to said tubular electrode.

* * * * *